United States Patent Office 3,567,462
Patented Mar. 2, 1971

3,567,462
METHOD FOR PRESERVING FRESH
ANIMAL TISSUE
Gerald Silverman, Brookline, and George T. Michael, Marshfield, Mass., assignors to Massachusetts Institute of Technology, Cambridge, Mass.
No Drawing. Filed Jan. 26, 1967, Ser. No. 611,847
Int. Cl. A23b 1/00, 3/00
U.S. Cl. 99—157
9 Claims

ABSTRACT OF THE DISCLOSURE

A method for extending the storage life of frseh animal tissue at refrigeration temperatures is disclosed. The animal tissue is subjected to radio pasteurization and stored in an atmosphere from about 30 percent carbon dioxide to 100 percent carbon dioxide at refrigeration temperatures. The pasteurization of tissue can precede, follow, or interrupt the carbon dioxide step and the storage atmosphere preferably contains at least 70 percent carbon dioxide.

---

The invention herein described was made in the course of or under a grant from the Department of Health, Education and Welfare.

The present invention is directed to a novel method for preserving fresh animal tissue. In essence it combines the step of radio pasteurization of tissue with the step of storing it in an atmosphere containing 30 percent up to 100 percent carbon dioxide under refrigeration conditions. Best results are obtained in carbon dioxide atmospheres of at least 70 percent.

Radio pasteurization of fresh animal tissue of many varieties have been subjected to an irradiation dose from approximately 50,000 to 400,000 rads. The irradiating step may precede, follow or interrupt the carbon dioxide storage step.

From time immemorial, many atempts have been made to extend the storage life of animal tissue. Although definite advances have been made, each procedure is subject to some limitations. For example, animal tissue which is cooked, smoked or cured is much less susceptible than fresh animal tissue to bacterial or mold destruction but the flavor of the tissue is also radically altered. Many chemicals have been tested as preservatives for fresh animal tissue but these have met with very limited commercial acceptances and governmental approval. While frozen animal tissue can be stored for prolonged periods of time without seriously effecting its flavor or edibility, maintenance of the necessary low temperature is expensive.

Among the various attempts in the past to extend the storage life of fresh animal tissue, experimenters have used carbon dioxide and also radio pasteurization but not the combination. Several experiments were carried out about 30 years ago during which the shelf life of fresh fish was extended somewhat by the use of carbon dioxide. The process did not achieve commercial acceptance, presumably because the added storage life was not significant enough to justify the expense of producing the necessary carbon dioxide atmosphere.

The use of irradiation to prolong the storage life of fresh animal tissue is of more recent vintage. It has been used in two fundamentally different procedures. In one procedure, the doses of irradiation applied to the tissue is so high that it renders the tissue sterile. In the second procedure, the dose of irradiation is much lower and it does not render the tissue sterile. The second procedure is known in the art as radio pasteurization and it is the procedure which is employed in the present invention.

The use of high doses of irradiation has met with resistance because it adversely effects the flavor of the animal. On the other hand radio pasteurization does not extend the storage life of fresh animal tissue long enough for many purposes.

As a practical matter, the amount of irradiation to which any given tissue may be subjected without influencing the flavor of the tissue varies from species to species. This is well known to those skilled in the art and can be further determined by routine experimentation. In practicing the invention the amount of irradiation to which the animal tissue is subjected should not exceed a level at which it will produce off flavors. For most types of fresh animal tissue, irradiation doses from about 50,000 to 200,000 rads may be used without any danger of noticeably altering the flavor of the tissue. This is however a subjective determination which will vary from individual to individual as well as from species to species. Therefore, an upper limit of about 400,000 rads is considered a practical cut-off point.

Now we have discovered that radio pasteurization and carbon dioxide can be effectively combined to significantly extend the storage life of fresh animal tissue at normal refrigeration temperatures. Under the combined treatment, fresh animal tissue retains its fresh flavors considerably longer than it does when stored either under comparable carbon dioxide atmosphere or after radio pasteurization. In addition, the tissue does not develop those undesirable odors and flavors which have been associated with high irradiation. In accordance with our procedure the fresh animal tissue is subjected to an irradiation dose of from about 50,000 rads to about 400,000 rads and stored at a temperature from about the freezing temperature of said tissue to about 45° F. in an atmosphere of about 30 percent to about 100 percent carbon dioxide. It is preferred to store the tissue from between 32–36° F. Under these conditions the microflora of the tissue is altered in a beneficial manner with resultant extended storage life.

For example, it has long been suspected that the microbes which spoil fish are pseudomonad and achromobacter. The results obtained in an experiment tend to substantiate this. The microflora present on fish which had spoiled under different conditions were determined. In fish which spoiled in air 45 of 47 cultures were from these two groups. Fish which had been irradiated with 100,000 rads produced 47 cultures of achromobacter out of 53; there were none from the pseudomonad group. Fish that spoiled in 100% $CO_2$ had no species from the achromobacter group but 13 out of 52 cultures were in the pseudomonad group. Surprisingly, fish which was irradiated with 100,000 rads and then stored under 100% $CO_2$ produced 3 cultures from the achromobacter group out of 55 cultures; there were none from the pseudomonad group. The time of spoilage also varied from group to group. The fish which was stored in air spoiled after 3 days. The fish subjected to 100,000 rads spoiled after 5 days. The fish stored under 100% $CO_2$ spoiled after 14 days, and the fish which received the combined treatment remained fresh for 22 days.

The means for radio pasteurization of fresh animal tissue can be any of the variety of means which have been previously described in the literature. A typical apparatus for this purpose has been described in Radiation Preservation of Foods, Publication #1273, National Academy of Science; National Research Council, Washington, D.C., 1965.

The carbon dioxide atmosphere can be achieved through a variety of means well known to those skilled in the art. For example, if the fresh animal tissue is stored in an airtight container, the container can be evacuated and the carbon dioxide introduced. The carbon dioxide level thus achieved will generally be in the neighborhood of 98 percent. It can be increased by again evacuating the container and refilling it with carbon dioxide. The carbon dioxide level will then be in the neighborhood of 100 percent. It is also possible to achieve the desired result by introducing carbon dioxide into the bottom of the container while leaving an opening at the top of the container. Since carbon dioxide is significantly heavier than oxygen or nitrogen, these latter gases will be displaced out of the container through the opening at the top and when the desired level of $CO_2$ is reached, then the container can be sealed. The latter method is considered a practical method to use in the preservation of meats and fish which are in large containers. For example, fish are usually placed in the hold of a ship and kept there for several days until the fishing vessel returns to port. The carbon dioxide, either in gaseous form or through the use of Dry Ice, can be introduced into the hold of the ship while at sea.

In practicing the present invention, it is preferred to use atmospheric levels of at least 70 percent carbon dioxide. Definite preservative effects are noticed when the invention is carried out with carbon dioxide levels from 30 percent up to about 70 percent. Carbon dioxide levels of approximately 30% are particularly useful with beef and poultry. However, the increase in storage time is most significant at the higher levels.

While we have been primarily concerned with extending the storage life of animal tissue which is fit for human consumption, primarily the muscular tissue of fish, poultry, beef, pork, lamb, etc., it is equally useful in preserving the storage life of whole animals such as fish and poultry and the viscera of the animals.

The present invention utilizes refrigeration temperatures. These temperatures can run from a point just above the freezing point of the animal tissue which will normally be approximately 32° F. to approximately 45° F. More commonly the upper temperature will not exceed 40° F. It is quite common in the transportation of fish, poultry and the like to bed them down in ice and thus obtain the desired refrigeration temperature. In this case it would be approximately 32° F.

In the examples which follow, we have used a strict standard to determine the cut-off point of the experiments. As soon as a detectable off odor was noted in connection with any single batch of animal tissue, the animal tissue was then eliminated from the experiment. As a practical matter, many of these samples were still fit for human consumption, but we were primarily concerned with developing a process in which the animal tissue would maintain as long as possible those attributes of fresh animal tissue including taste and odor. For these purposes the combination of steps which underlie the present experiment were found to produce a much longer storage life than one would expect from the results obtained from the use of either irradiation or carbon dioxide alone.

Th following examples are illustrative of the present invention. Many variations thereof will be obvious to those skilled in the art.

EXAMPLE 1

Haddock fillets from a commercial source weighing approximately one pound each were divided into eight groups of three fillets.

Group A, which was used as the control, was placed in a sealed glass jar and stored at 36.5° F.

Group B was subjected to an irradiation dose of 50,000 rads before it was placed in a sealed glass jar and stored at 36.5° F.

Group C was treated in the same manner as Group B except that it was subjected to an irradiation dose of 100,000 rads.

Group D was treated in the same manner as Group B except that it was subjected to an irradiation dose of 200,000 rads.

Group E was treated in the same manner as Group B except that it was subjected to an irradiation dose of 250,000 rads.

Group F was placed in a glass jar which had means for evacuating the gas and replacing it with another gas. The atmosphere was exhausted from the top, and then $CO_2$ was pumped in. The jar was flushed twice more with $CO_2$, and an atmosphere of substantially 100 percent $CO_2$ was obtained in this manner. The glass jar was then stored in the same manner as the control; namely, at a temperature of 36.5° F.

Groups G and H were treated in the same manner as Group F except that the fillets in Group G were first subjected to an irradiation dose of 50,000 rads, and the fillets in Group H were subjected to an irradiation dose of 100,000.

The fish developed a detectable off odor as follows:

| Sample: | Days |
|---|---|
| A | 3 |
| B | 4 |
| C | 5 |
| D | 6 |
| E | 7 |
| F | 14 |
| G | 21 |
| H | 22 |

It should be noted that irradiation of fish stored in air at 36.5° F. preserved the fish in a fresh condition for a very short time beyond that encountered with the control. When the fish was irradiated with 50,000 rads, the shelf life was extended approximately one day. When irradiated with 100,000 rads, it was extended approximately two days. Even when it was irradiated with 250,000 rads, the shelf life was only extended four days. In contrast, when fish was irradiated with 50,000 and 100,000 rads and stored under carbon dioxide, the shelf life was surprisingly extended for seven and eight days respectively over that achieved with fish stored under carbon dioxide without irradiation.

EXAMPLE 2

The experiment set forth in Example 1 was repeated with a new batch of fillets. The same procedures were followed and the fillets were treated in the same manner set forth above. The sole difference between the two experiments resided in the fact that the initial bacteria count in the fillets in the second experiment was considerably lower than the initial bacteria count found in the fish in Example 1. The results varied somewhat from the results obtained in the first experiment but the same general pattern was achieved.

| Sample: | Days |
|---|---|
| A | 5 |
| B | 7 |
| C | 7 |
| D | 9 |
| E | 9 |
| F | 16 |
| G | 24 |
| H | 25 |

EXAMPLE 3

Chicken, pork, and beef were also tested according to the present invention.

A half of a boiler chicken was subjected to each of the following sets of conditions until spoilage was noted by development of off odors:

(1) Storage at 36.5° F.

(2) Storage at 36.5° F. after irradiation with 100,000 rads.

(3) Storage at 36.5° F. in an atmosphere of substantially 100% carbon dioxide.

(4) Storage at 36.5° F. in an atmosphere of substantially 100% carbon dioxide after irradiation with 100,000 rads.

Additional tests were run using the same sets of conditions but substituting for the chicken broiler (a) approximately one pound of pork [3 or 4 loin chops in each sample], and (b) approximately one and one-half pounds of beefsteak [2 steaks in each sample]. In each case, the combined treatment of irradiation and carbon dioxide significantly extends the shelf life of the animal tissue beyond that which was expected.

SPOILAGE TIMES IN DAYS AT 36.5° F.

| Tissue | Air | Irradiation and air | $CO_2$ | Irradiation and $CO_2$ |
| --- | --- | --- | --- | --- |
| Chicken | 4 | 6 | 13 | 20 |
| Beef | 4 | 10 | 20 | 27 |
| Pork | 4 | 13 | 27 | 46 |

What is claimed is:

1. A method for preserving fresh animal tissue which comprises subjecting said tissue to an irradiation pasteurization dose from aproximately 50,000 rads to about 400,000 rads and storing said tissue in an atmosphere of approximately 30 percent to 100 percent carbon dioxide at a temperature between the freezing temperature of said tissue and approximately 45° F.

2. The method of claim 1 wherein the atmosphere is from about 70 percent to 100 percent carbon dioxide.

3. The method of claim 2 wherein the temperature is from about 32° F. to about 36° F.

4. The method of claim 3 wherein the fresh animal tissue is fish.

5. The method of claim 4 wherein the fish is haddock.

6. The method of claim 3 wherein the fresh animal tissue is poultry.

7. The method of claim 6 wherein the poultry is chicken.

8. The method of claim 3 wherein the fresh animal tissue is beef.

9. The method of claim 3 wherein the fresh animal tissue is pork.

References Cited

UNITED STATES PATENTS

| | | | |
| --- | --- | --- | --- |
| 3,483,005 | 12/1969 | Urbain et al. | 99—217 |
| 2,456,909 | 12/1948 | Brasch | 99—157UX |
| 2,965,494 | 12/1960 | Williams | 99—157 |
| 2,973,271 | 2/1961 | Baldwin et al. | 99—217X |
| 3,434,850 | 3/1969 | Huff | 99—217 |

HYMAN LORD, Primary Examiner

U.S. Cl. X.R.

99—158, 187, 188, 217